United States Patent [19]
Kajitani et al.

[11] Patent Number: 5,641,049
[45] Date of Patent: *Jun. 24, 1997

[54] ANNULAR CLUTCH RELEASE CYLINDER ASSEMBLY AND CLUTCH DEVICE

[75] Inventors: Koji Kajitani; Norihisa Uenohara; Hiroshi Uehara, all of Osaka, Japan

[73] Assignee: Exedy Corporation, Osaka, Japan

[*] Notice: The term of this patent shall not extend beyond the expiration date of Pat. No. 5,480,017.

[21] Appl. No.: 535,495

[22] Filed: Sep. 28, 1995

Related U.S. Application Data

[63] Continuation-in-part of Ser. No. 227,924, Apr. 15, 1994, Pat. No. 5,480,017.

[30] Foreign Application Priority Data

Oct. 19, 1994 [JP] Japan ................................. 6-281248

[51] Int. Cl.⁶ ...................................................... F16D 25/08
[52] U.S. Cl. ................................................ 192/91 A; 192/98
[58] Field of Search ........................... 192/85 CA, 91 A, 192/98; 92/107, 165 PR

[56] References Cited

U.S. PATENT DOCUMENTS

| | | | |
|---|---|---|---|
| 4,186,828 | 2/1980 | Renaud | 192/98 |
| 4,585,106 | 4/1986 | Shirley | 192/85 CA |
| 4,869,355 | 9/1989 | Corral et al. | 192/98 |
| 4,938,332 | 7/1990 | Thomas et al. | 192/85 CA |
| 4,960,193 | 10/1990 | Hodge | 192/91 A |
| 4,993,529 | 2/1991 | Leigh-Monstevens et al. | 192/85 CA |
| 5,480,017 | 1/1996 | Uenohara et al. | 192/98 |

FOREIGN PATENT DOCUMENTS

| | | | |
|---|---|---|---|
| 2259346 | 3/1993 | United Kingdom | 192/91 A |

*Primary Examiner*—Richard M. Lorence
*Attorney, Agent, or Firm*—Skjerven, Morrill, MacPherson, Franklin & Friel; Thomas S. MacDonald

[57] ABSTRACT

In an annular clutch release cylinder assembly comprising an annular piston and a cylinder housing formed by nesting a pair of cylinder members, each comprising a tubular portion and a radial flange, with each other. The annular piston is guided and reinforced by the cylindrical extension of one of the cylinder members so that the annular piston is made highly rigid against bending deformation. Therefore, the annular piston can be made of plastic material so that the weight and the fabrication cost of the release cylinder assembly may be reduced. By placing the flanges of the cylinder members directly one over the other, and forming at least a part of the passage leading to the annular slot by forming a recess in one of the flanges of the cylinder members, it is possible to reduce the axial dimension of the clutch release cylinder assembly.

13 Claims, 4 Drawing Sheets

ANNULAR CLUTCH RELEASE CYLINDER ASSEMBLY AND CLUTCH DEVICE

CROSS-REFERENCE TO THE RELATED APPLICATION(S)

This is a CIP application of U.S. patent application Ser. No. 08/227,924 filed Apr. 15, 1994 now U.S. Pat. No. 5,480,017.

TECHNICAL FIELD

The present invention relates to an annular hydraulic cylinder assembly, and in particular to an annular hydraulic cylinder assembly for selectively engaging and disengaging a clutch device via a release bearing.

BACKGROUND OF THE INVENTION

An automotive clutch device is normally provided with a release mechanism that includes a hydraulic cylinder which is actuated by hydraulic pressure produced by a master cylinder. The master cylinder is in turn actuated by pressing on a clutch pedal. The pressurized actuation oil, supplied by the master cylinder, displaces a release bearing in the axial direction via a release fork, and the release bearing presses upon a central part of the diaphragm spring to move the pressure plate away from the flywheel, thereby disengaging the clutch disk from the flywheel.

As the output power of the automotive engine is increased, the transmission capacity of the automotive clutch device has to be accordingly increased. One typical approach is to increase the spring force of the diaphragm spring of the clutch device. This in turn causes an increase in the force required to release the clutch device so that a major concern now is to minimize the effort required to release the clutch device. The force required to release a clutch device can be reduced by increasing the cross sectional area of the release cylinder and/or to increase the length of the release fork. This however not only increases the pedal stroke needed to release the clutch device but also necessitates a larger space for accommodating the clutch release mechanism. For instance, a powered actuator, which uses intake negative pressure, can be used to reduce the effort required to release the clutch device without increasing the necessary pedal stroke, but requires a large mounting space and tends to be highly complex and expensive.

It is proposed in U.S. Pat. No. 4,938,332, issued to J. J. Thomas et al., to use an annular hydraulic cylinder assembly to directly actuate the release bearing, without using a release fork. An annular piston is received in a complementary annular cylinder, and a large pressure receiving surface can be achieved without increasing the external dimensions of the release mechanism. Furthermore, elimination of a release fork allows more efficient utilization of the actuation force, and can hence reduce the effort required to release the clutch device.

In an annular clutch release cylinder assembly of this type, some bending stress is produced in the annular piston as it is highly difficult to precisely align the line of force of the thrust applied to the piston with the reaction acting upon the release bearing which comes into contact with the diaphragm spring. Therefore, the annular piston must have a sufficient rigidity to be able to smoothly slide in the cylinder so that it is not practical to use plastic material for the annular cylinder. This is detrimental to reducing the weight of the annular piston.

Furthermore, as the axial dimension of the cylinder assembly has been reduced, the tilting of the piston has emerged as a major problem. Tilting of the piston could cause seizure of the piston, and cannot be tolerated for reliable operation of the clutch release cylinder.

The annular cylinder assembly disclosed in the U.S. Pat. No. 4,938,332 requires that conduits be provided in the cylinder assembly for supplying actuating oil to the cylinder; however, the conduits prevented the annular cylinder assembly from being made as compact as desired. In particular, conduits are required to be provided in the bottom region of the annular cylinder assembly which increases the axial dimension of the cylinder assembly.

BRIEF SUMMARY OF THE INVENTION

In view of such problems of the prior art, a primary object of the present invention is to provide an annular hydraulic cylinder assembly which can minimize the force required to actuate the cylinder, and has a very small axial length.

A second object of the present invention is to provide an annular hydraulic cylinder assembly which can ensure smooth movement of the annular piston while minimizing the weight of the annular piston.

A third object of the present invention is to provide an annular hydraulic cylinder assembly which can ensure smooth movement of the annular piston while minimizing the fabrication cost.

These and other objects of the present invention can be accomplished by providing an annular hydraulic cylinder assembly for selectively releasing a clutch device, comprising: an annular cylinder housing aligned coaxially with an axial center line of the clutch device, and defining an annular slot having an open end facing the clutch device and a closed bottom end facing away from the clutch device, the annular cylinder housing comprising a pair of cylinder members each formed by drawing sheet metal, and provided with a flange and a tubular portion, the tubular portion of one of the cylinder members being larger than that of the tubular portion of the other cylinder member, and the annular slot being defined between the tubular portions which are coaxially nested with each other; an annular piston slidably received in the annular slot; and an annular clutch release bearing assembly including a release bearing, a bearing seat which is fixedly secured to an external axial end of the annular piston and which supports the release bearing, and a pressure flange supported by the release bearing and adapted to engage a central part of diaphragm spring means of the clutch device; wherein the tubular portion of an inner one of the cylinder members is provided with a cylindrical extension which has a reduced diameter extending coaxially toward the clutch device, and the annular clutch release bearing assembly is fitted on the cylindrical extension in an axially slidable manner.

Because the outer end of the annular piston is reinforced by the annular clutch release bearing assembly which is engaged by the cylindrical extension of the inner cylinder member, the annular piston is prevented from bending deformation even when the line of force acting on the annular piston over its circumference is out of alignment with the reaction applied by the central part of the diaphragm spring.

According to one aspect of the present invention, the flanges of the cylinder members are substantially directly placed one over the other, and a part of an oil passage leading to a bottom region of the annular slot is defined between the flanges. Thus, the axial dimension of the cylinder housing can be minimized, and the fabrication of the cylinder housing can be made both simple and economical.

According to a preferred embodiment of the present invention, a connector member is secured to the outer cylinder member, the connector member being provided with a bore which communicates with the bottom region of the annular slot via a hole provided in the flange of the outer cylinder member, and a recess formed in the flange of the inner cylinder member. Alternatively, the recess may be formed in the flange of the outer cylinder member. The sealing of the passage defined between the flanges of the cylinder members can be achieved by interposing an O-ring between them.

A spring member is needed to urge the piston toward the clutch device to accommodate the change in the position of the central part of the diaphragm which results from the wear of the clutch disk. To install a spring member for such a purpose, an annular recess facing the clutch device may be defined between the cylindrical extension and the tubular portion of the inner cylinder member so that the annular clutch release bearing assembly may define an annular shoulder opposing the annular recess, a compression coil spring being interposed between the annular recess and the annular shoulder.

According to a preferred embodiment of the present invention, the annular clutch release bearing assembly comprises a first cylindrical extension, which coaxially extends from the annular piston toward the clutch device, whereby the clutch release bearing is fitted into an inner bore of the first cylindrical extension. Preferably, the annular clutch release bearing assembly comprises a second cylindrical extension, which coaxially extends from the annular piston toward the clutch device inside the first cylindrical extension, and which is slidably engaged by the cylindrical extension of the inner cylinder member.

To protect the sliding surface of the annular piston from dust and other foreign matter, the annular piston may be provided with a cylindrical dust cover extending coaxially from an end of the annular piston facing the clutch device so that a free end of the dust cover may engage an outer circumferential surface of the tubular portion of the outer cylinder member.

To ensure reliable operation of the annular cylinder assembly, it is necessary to prevent relative rotation between the annular piston and the cylinder housing around the axial center line of the cylinder housing. This can be accomplished by providing rotation preventing means between the connector member and the dust cover. Alternatively, the rotation preventing means may be provided between the clutch release bearing assembly and the cylindrical extension of the inner cylinder member.

BRIEF DESCRIPTION OF THE DRAWINGS

The present invention is now described in the following with reference to the appended drawings, in which.

DETAILED DESCRIPTION OF THE PREFERRED EMBODIMENTS

Figure 1:
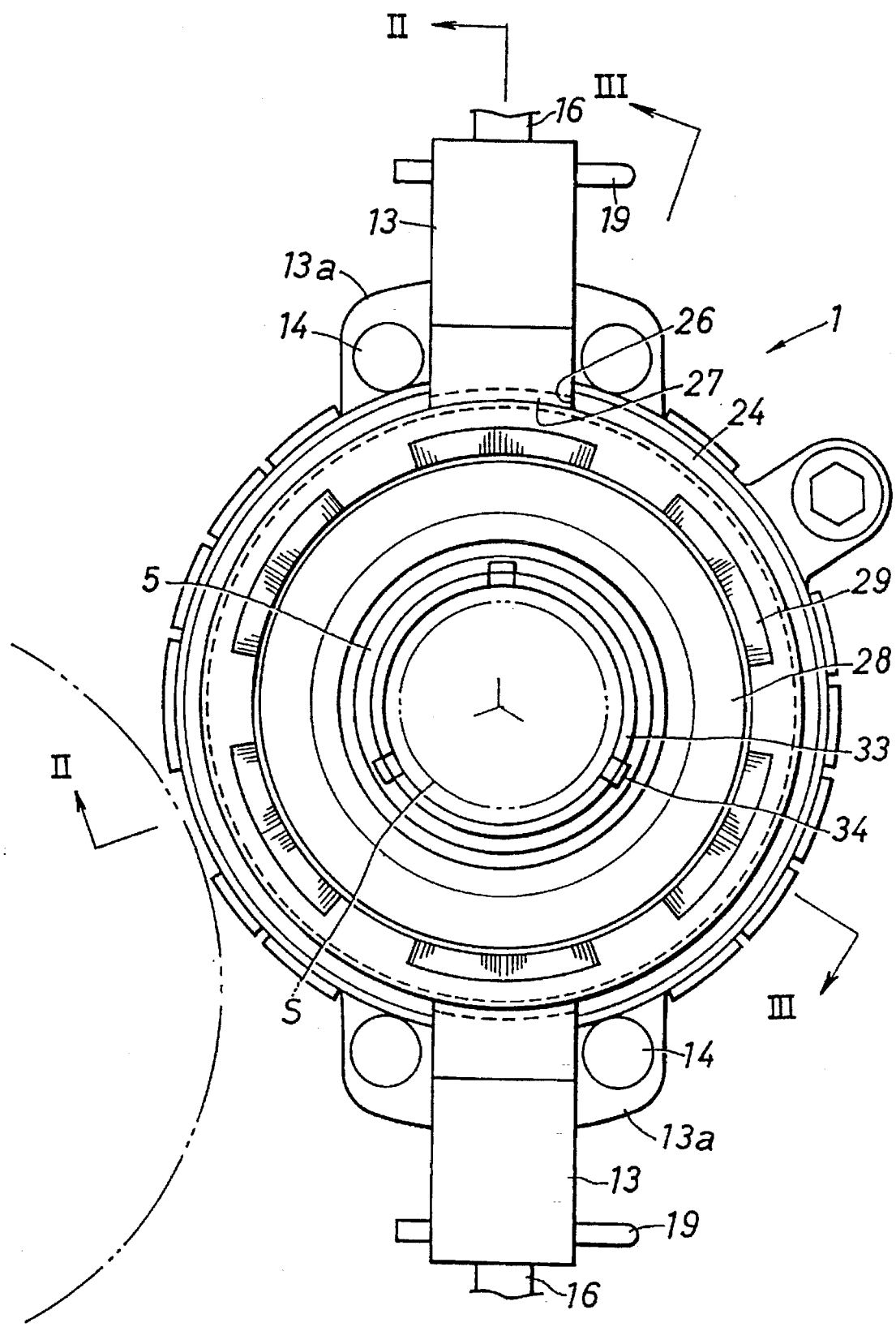
FIG. 1 is a front view of an embodiment of the annular hydraulic cylinder assembly according to the present invention.
Figure 2A:
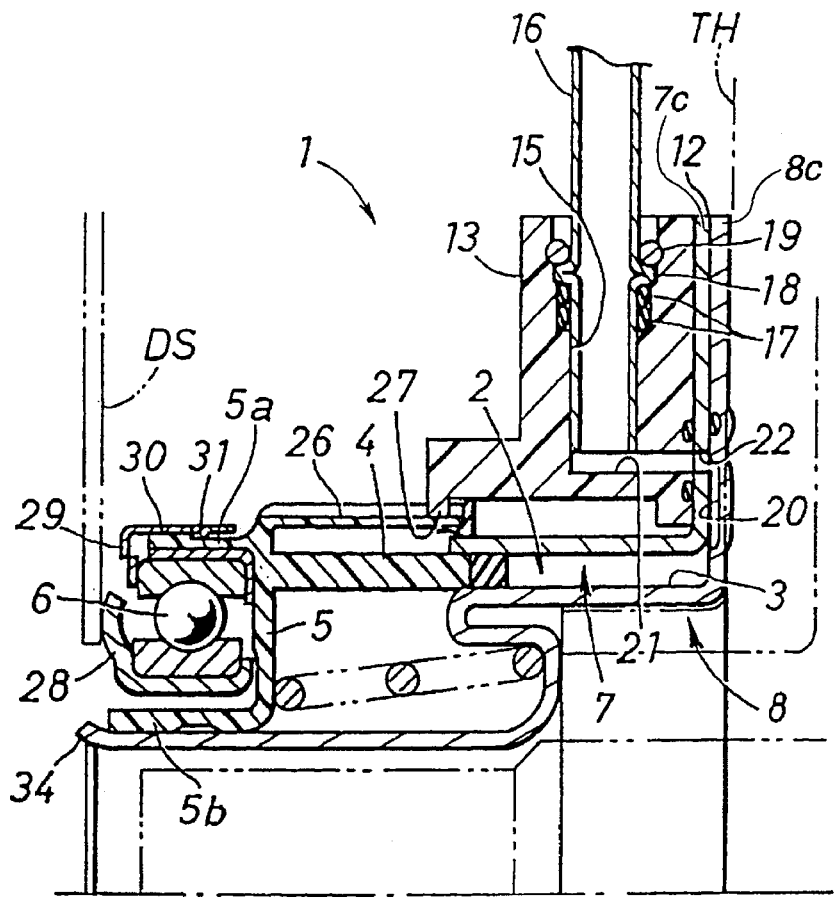
FIGS. 2A is a sectional view taken on the top half of section line II—II of FIG. 1 showing the clutch disengaged.
Figure 2B:
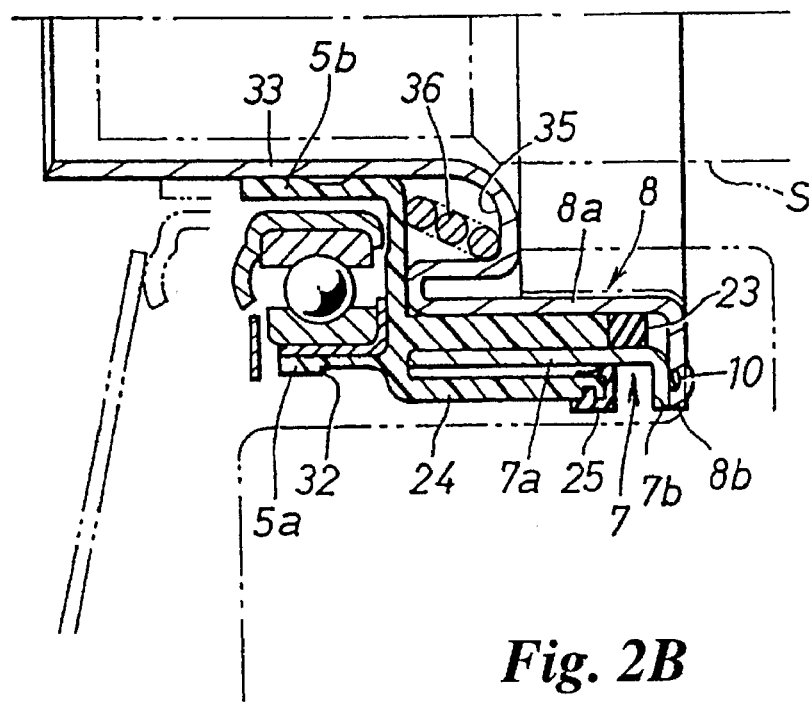
FIG. 2B is a sectional view taken on the lower half of section line II—II of FIG. 1 showing the clutch engaged.
Figure 3:
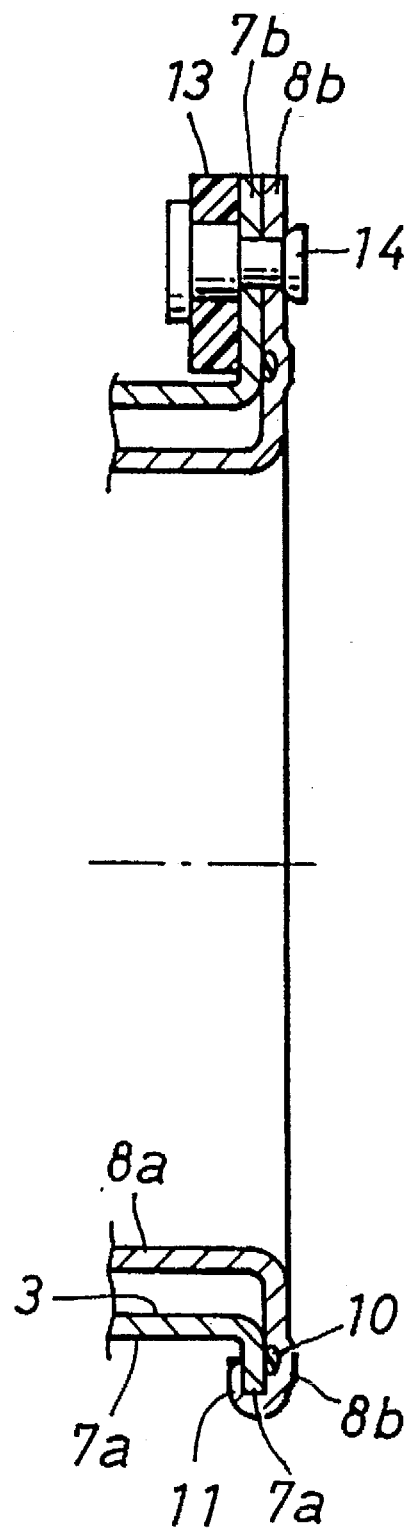
FIG. 3 is a fragmentary sectional view taken along line III—III of FIG. 1.

FIGS. 1 through 3 show a first embodiment of the annular hydraulic cylinder assembly according to the present invention. In FIG. 2A, the upper half shows the cylinder assembly when hydraulic pressure is supplied to the cylinder assembly and the clutch device is thereby disengaged. In FIG. 2B, a the lower half shows the cylinder assembly when hydraulic pressure is not supplied to the cylinder assembly and the clutch device is thereby engaged.

This clutch release cylinder assembly 1 comprises a cylinder housing 2 fixedly secured to a transmission housing TH, an annular piston 4 received in an annular slot 3 defined in the cylinder housing 2, and a release bearing 6 fitted into an annular bearing carrier 5 integrally and coaxially extending from the outer axial end of the annular piston 4. The entire assembly is generally coaxial with the input shaft S of the transmission.

The cylinder housing 2 consists of a pair of cylinder members 7 and 8, each including a tubular portion 7a or 8a, and a radial flange 7b or 8b, which are formed by stamp forming sheet metal. One of the tubular portions 8a is smaller in diameter than the other tubular portion 7a, and the cylinder member 8 is nested in the other cylinder member 7, whereby the annular slot 3 is defined between the two tubular portions 7a and 8a. The outer profiles of the radial flanges 7b and 8b are made conformal to each other. The two radial flanges 7b and 8b are placed directly one over the other, and an O-ring 10 is interposed between the two radial flanges 7b and 8b to seal off the bottom end of the annular slot 3. The radial flanges 7b and 8b are fixedly secured to each other by crimping the peripheral edge 11 of one of the radial flanges 8 onto that of the other as best illustrated in FIG. 3.

The radial flanges 7b and 8b are each provided with a pair of radial extensions 7c or 8c at diagonally opposing positions thereof, and a pair of connector members 13, which are made of plastic material, are fixedly secured to the radial extensions 7c or 8c by rivets 14 which are each passed through an extension 13a (FIG. 1) of the connector member 13 and the radial extensions 7c and 8c of the radial flanges 7b and 8b, respectively. Each of the connector members 13 is provided with a bore 15 which receives a pipe 16 via an O-ring 17. The end portion of the pipe 16 received in the bore 15 is provided with a radial flange 18, and the pipe 16 is retained in the bore 15 by passing a U-shaped clip 19 laterally across and through the connector member 13. The U-shaped clip 19 engages the radial flange 18 of the pipe 16.

The bore 15 of each connector member 13 communicates with the annular slot 3 via a longitudinal passage 21 provided in the connector member 13, a hole 22 provided in the flange 7b, and a recess 20 defined by forming a bulge in the flange 8b by stamp forming. The bulge slightly protrudes toward the transmission housing TH from the major mounting surface of the flange 8b but it can be accommodated by one of a plurality of recesses which are normally present in the mounting surface of the transmission housing TH. One of the connector members 13 is connected to the master cylinder (not shown in the drawings) while the other connecting member 13 is fitted with an air purge plug (not shown in the drawings).

The annular piston 4 is slidably received in the annular slot 3, and a liquid tight fit is ensured by an annular seal member 23 attached to the inner axial end of the annular piston 4. The annular piston 4 is further provided with an annular dust cover 24 which extends integrally and coaxially around the annular piston 4. The axial inner end of the dust cover 24 is fitted with an annular seal 25 which engages the outer circumferential surface of the tubular portion 7a, whereby dust and other foreign matter are excluded from the sliding surface of the annular piston 4 received in the annular slot 3.

The outer circumferential surface of the dust cover 24 is provided with a pair of axial grooves 26 at diagonally opposing positions thereof, and corresponding projections 27 provided in the connector members 13 engage these grooves 26, whereby the relative rotation of the annular piston 4 with respect to the cylinder housing 2 is prevented.

The bearing carrier 5 is provided with first and second cylindrical extensions 5a and 5b coaxially extending from the outer end of the piston 4 toward the clutch device. The release bearing 6 is fitted into a bearing seat defined by the inner circumferential surface of the first cylindrical extension 5a which surrounds the second cylindrical extension 5b. The release bearing 6 is provided with a self-aligning mechanism so that a contact flange 28, which is fixedly secured to the inner race of the release bearing 6, can engage the central region of the diaphragm spring DS uniformly over its entire circumference. To enhance the self-aligning feature of the release bearing 6, the outer race of the release bearing 6 is resiliently retained in the bearing carrier 5 by a wave washer 29, having a cylindrical main part 30 fitted on the outer circumferential surface of the first cylindrical extension 5a of the bearing carrier 5, so that slight axial movement of the release bearing 6 may be resiliently accommodated. The wave washer 29 is retained on the outer circumferential surface of the cylindrical extension 5a of the bearing carrier 5 by barbs 31 which are lifted from the cylindrical main part 30 of the wave washer 29 with a shoulder surface 32 defined in the annular extension 5a. The main part 30 of the wave washer 29 reinforces the first extension 5a against the radial force that may be applied thereto by the release bearing 6.

The tubular portion 8a of the inner cylinder member 8 is provided with a cylindrical extension 33 which has a reduced diameter and extends away from the transmission housing TH in a coaxial manner. The input shaft S of the transmission is centrally passed through this cylindrical extension 33. The second cylindrical extension 5b of the bearing carrier 5 is slidably fitted on the cylindrical extension 33. The outer axial end of the cylindrical extension 33 of the inner cylinder member 8 is provided with three tabs 34 which are bent radially outwards to prevent the annular piston 4 from being dislodged from the annular slot 3.

An annular recess 35 facing the diaphragm spring DS is defined between the cylindrical extension 33 and the tubular portion 8a, and a compression coil spring 36 is interposed between the annular recess 35 and the opposing bottom wall of the bearing carrier 5 so that the annular piston 4 may always be urged toward the diaphragm spring DS, and so that the release bearing 6 may thereby maintain contact with the diaphragm spring DS without regard to the wear of the clutch disk.

The mode of operation of this clutch release cylinder assembly is now described in the following.

When the clutch pedal is not pressed upon, and no hydraulic pressure is therefore applied to the annular piston 4, the annular piston 4 is fully received in the annular slot 3. The release bearing 6 is positioned on the side of the transmission housing TH by the spring force of the diaphragm spring DS. Under this condition, the diaphragm spring DS applies a spring force to the pressure plate which in turn presses the clutch disk against the flywheel, whereby the output from the engine is transmitted to the transmission. As the clutch disk wears out, the central part of the diaphragm spring DS moves progressively toward the transmission housing TH, and the annular piston 4 is positioned deeper in the annular slot 3. The lower half of FIG. 2 shows the release cylinder assembly when the clutch disk has totally worn out, and the annular piston 4 has been received in the annular slot 3 to the deepest possible extent. When the clutch disk is new, the contact flange 28 advances toward the clutch device as indicated by the imaginary lines in FIG. 2 in the disengaged condition of the clutch device.

When the clutch pedal is pressed down, and hydraulic pressure produced in the master cylinder is transmitted to the connector member 13, via the pipe 16, to the annular slot 3 via the axial passage 21, to the hole 22 provided in the radial flange 7b, and to the recess 20 provided in the radial flange 8b. As a result, the bearing carrier 5 integrally formed with the annular piston 4, along with the release bearing 6, pushes out toward the clutch device, and presses the central part of the diaphragm spring DS to thereby relieve the pressure applied to the pressure plate. As a result, the clutch disk is disengaged from the flywheel, and the output from the engine is no longer transmitted to the transmission.

Figure 4:
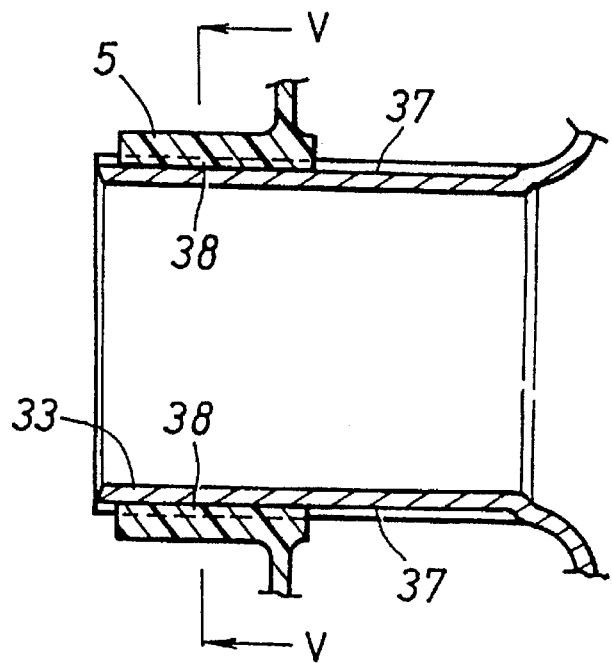
FIG. 4 is a fragmentary sectional side view of an alternate embodiment of the annular hydraulic cylinder assembly according to the present invention.
Figure 5:
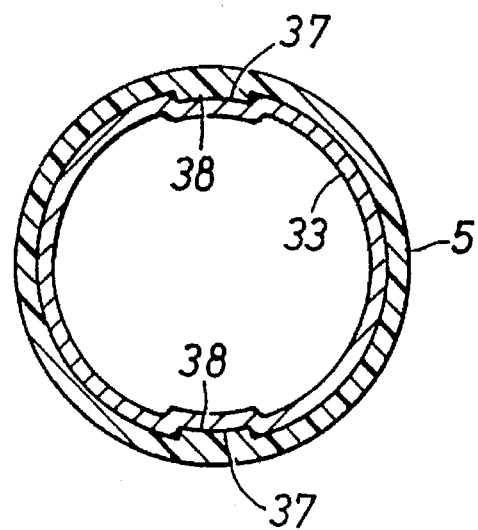
FIG. 5 is a sectional view taken along line V—V of FIG. 4.

FIGS. 4 and 5 show an alternate embodiment of the structure for preventing the relative rotation between the annular piston 4 and the cylinder housing 2. In this embodiment, a pair of axial grooves 37 (or axial ridges) are provided on the outer circumferential surface of the cylindrical extension 33 of the cylinder member 7, and corresponding axial ridges 38 (or axial grooves) are formed on the inner circumferential surface of the bearing carrier 5 to prevent the relative rotation between the annular piston 4 and the cylinder housing 2.

Thus, according to the present invention, because the annular piston is guided by the cylindrical extension of one of the cylinder members, the annular piston is made highly rigid against bending deformation. In other words, the annular piston is reinforced by the cylindrical extension of the cylinder member, and is not itself required to be highly rigid. Therefore, the annular piston can be made of plastic material so that the weight and the fabrication cost of the release cylinder assembly may be reduced. Also, the guiding action of the cylindrical extension of the cylinder member is effective in preventing the annular piston from tilting as it is moved back and forth along the axial direction. Hence, the reliability of the clutch release cylinder assembly can be improved.

By forming the cylinder housing with a pair of cylinder members, each comprising a tubular portion and a radial flange, which are nested one in the other, it is possible to economically fabricate the cylinder housing. Furthermore, by placing the flanges of the cylinder members directly one over the other, and forming at least a part of the passage leading to the annular slot by forming a recess in one of the flanges of the cylinder members, it is possible to reduce the axial dimension of the clutch release cylinder assembly.

Although the present invention has been described in terms of preferred embodiments thereof, it is obvious to a person skilled in the art that various alterations and modifications are possible without departing from the scope of the present invention which is set forth in the appended claims.

What we claim is:

1. An annular hydraulic cylinder assembly and a clutch device including a diaphragm spring means for engaging the clutch device, said assembly selectively releasing said clutch device, said assembly comprising:

an annular cylinder housing aligned coaxially with an axial center line of said clutch device, and defining an annular slot having an open end facing said clutch device and a closed bottom end facing away from said clutch device, said annular cylinder housing comprising a pair of cylinder members each formed by drawing sheet metal, and provided with a flange and a tubular portion, said tubular portion of one of said cylinder members being larger than that of the tubular portion of the other cylinder member, and said annular slot being defined between said tubular portions which are coaxially nested with each other;

an annular piston slidably received in said annular slot; and an annular clutch release bearing assembly including a release bearing, a bearing seat which is fixedly secured to an external axial end of said annular piston and which supports said release bearing, and a pressure flange supported by said release bearing and adapted to engage a central part of the diaphragm spring means of said clutch device;

wherein said tubular portion of an inner one of said cylinder members is provided with a cylindrical extension which has a reduced diameter extending coaxially toward said clutch device, and said annular clutch release bearing assembly is fitted on said cylindrical extension in an axially slidable manner.

2. An annular hydraulic cylinder assembly and clutch device according to claim 1, wherein an annular recess facing said clutch device is defined between said cylindrical extension and said tubular portion of said inner cylinder member, and said annular clutch release bearing assembly defines an annular shoulder opposing said annular recess, a compression coil spring being interposed between said annular recess and said annular shoulder.

3. An annular hydraulic cylinder assembly and clutch device according to claim 2, wherein said annular clutch release bearing assembly comprises a first cylindrical extension coaxially extending from said annular piston toward said clutch device, and said clutch release bearing is fitted into an inner bore of said first cylindrical extension.

4. An annular hydraulic cylinder assembly and clutch device according to claim 3, wherein said annular clutch release bearing assembly comprises a second cylindrical extension coaxially extending from said annular piston toward said clutch device inside said first cylindrical extension, and wherein said second cylindrical extension is slidably engaged by said cylindrical extension of said inner cylinder member.

5. An annular hydraulic cylinder assembly and clutch device according to claim 4, wherein said annular shoulder defined by said annular clutch release bearing assembly is defined by a base end of said second cylindrical extension extending from said annular piston.

6. An annular hydraulic cylinder assembly and clutch device according to claim 1, wherein the annular piston is provided with a cylindrical dust cover extending coaxially from an end of said annular piston facing said clutch device, and a free end of said dust cover engages an outer circumferential surface of said tubular portion of said outer cylinder member.

7. An annular hydraulic cylinder assembly and clutch device according to claim 6, further comprising a connector member attached to said outer cylinder member, said connector member and said dust cover being engaged with each other by rotation preventing means for preventing relative rotation between them around an axial center line of said annular hydraulic cylinder assembly.

8. An annular hydraulic cylinder assembly and clutch device according to claim 1, wherein said clutch release bearing assembly and said cylindrical extension of said inner cylinder member are engaged with each other by rotation preventing means for preventing relative rotation between them around an axial center line of said annular hydraulic cylinder assembly.

9. An annular hydraulic cylinder assembly and clutch device according to claim 1, wherein said flanges of said cylinder members are substantially directly placed one over the other, and a part of an oil passage leading to a bottom region of said annular slot is defined between said flanges.

10. An annular hydraulic cylinder assembly and clutch device according to claim 9, further comprising a connector member secured to said outer cylinder member, said connector member being provided with a bore which communicates with said bottom region of said annular slot via a hole provided in said flange of said outer cylinder member, and a recess formed in said flange of said inner cylinder member.

11. An annular hydraulic cylinder assembly and clutch device for selectively releasing a clutch device, comprising:

an annular cylinder housing aligned coaxially with an axial center line of said clutch device, and defining an annular slot having an open end facing said clutch device and a closed bottom end facing away from said clutch device, said annular cylinder housing comprising a pair of cylinder members each formed by drawing sheet metal, and provided with a flange and a tubular portion, said tubular portion of one of said cylinder members being larger than that of the tubular portion of the other cylinder member, and said annular slot being defined between said tubular portions which are coaxially nested with each other;

an annular piston slidably received in said annular slot; and an annular clutch release bearing assembly including a release bearing, a bearing seat which is fixedly secured to an external axial end of said annular piston and which supports said release bearing, and a pressure flange supported by said release bearing and adapted to engage a central part of diaphragm spring means of said dutch device;

wherein said flanges of said cylinder members are substantially directly placed one over the other, and a part of an oil passage leading to a bottom region of said annular slot is defined between said flanges.

12. An annular hydraulic cylinder assembly and clutch device according to claim 11, further comprising a connector member secured to said outer cylinder member, said connector member being provided with a bore which communicates with said bottom region of said annular slot via a hole provided in the flange of said outer cylinder member, and a recess formed in the flange of said inner cylinder member.

13. An annular hydraulic cylinder assembly for selectively releasing a clutch device, said assembly comprising:

an annular cylinder housing adapted to be aligned coaxially with an axial center line of a clutch device to be released, said housing defining an annular slot having an open end adapted to face the clutch device and a closed bottom end adapted to face away from the clutch device, said annular cylinder housing comprising a pair of cylinder members each formed by drawing sheet metal, and provided with a flange and a tubular portion, said tubular portion of one of said cylinder members being larger than that of the tubular portion of the other cylinder member, and said annular slot being defined between said tubular portions which are coaxially nested with each other;

an annular piston slidably received in said annular slot; and an annular clutch release bearing assembly including a release bearing, a bearing seat which is fixedly secured to an external axial end of said annular piston and which supports said release bearing, and a pressure flange supported by said release bearing and adapted to engage a central part of a diaphragm spring means of the clutch device; and wherein said tubular portion of an inner one of said cylinder members is provided with a cylindrical extension which has a reduced diameter adapted to extend coaxially toward the clutch device, and said annular clutch release bearing assembly is fitted on said cylindrical extension in an axially slidable manner.

* * * * *